Figure 1:
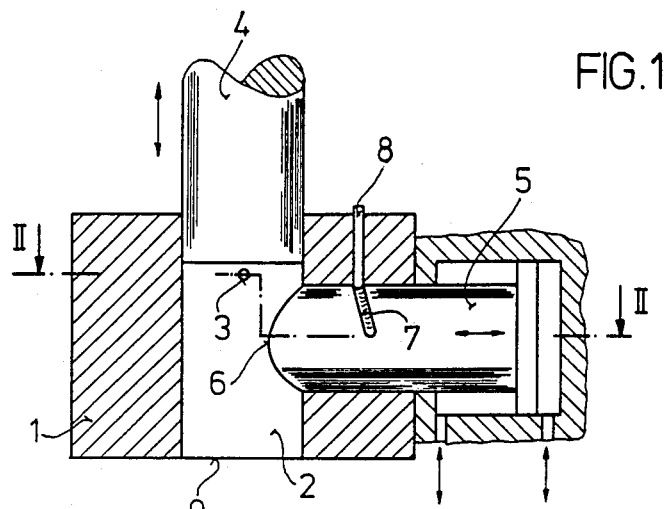

United States Patent [19]

Wallner

[11] Patent Number: 4,702,890
[45] Date of Patent: Oct. 27, 1987

[54] MIXING HEAD FOR MIXING TWO OR MORE PLASTICS COMPONENTS WHICH REACT TO FORM FOAM, IN PARTICULAR POLYURETHANE

[75] Inventor: Josef Wallner, Holzkirchen, Fed. Rep. of Germany

[73] Assignee: Elastogran Maschinenbau GmbH, Strasslach, Fed. Rep. of Germany

[21] Appl. No.: 810,167

[22] Filed: Dec. 18, 1985

[30] Foreign Application Priority Data

Dec. 21, 1984 [DE] Fed. Rep. of Germany ....... 3446818

[51] Int. Cl.$^4$ .......................... B01F 5/04; B01F 15/02; B01J 14/00
[52] U.S. Cl. .................................... 422/133; 366/173; 422/224
[58] Field of Search ............... 422/111, 108, 133, 224; 366/134, 135, 137, 159, 173, 174; 137/625.4

[56] References Cited

U.S. PATENT DOCUMENTS 4,379,122  4/1983  Taubenmann .................. 422/133
4,510,120  4/1985  Bauer ............................ 422/133

FOREIGN PATENT DOCUMENTS 2007935  9/1971  Fed. Rep. of Germany .
2065841  5/1976  Fed. Rep. of Germany .

*Primary Examiner*—Michael Marcus
*Attorney, Agent, or Firm*—Keil & Weinkauf

[57] ABSTRACT

The mixing head is provided with a flow restrictor 5 which can be driven into the mixing chamber 2 downstream of the inlet orifices 3, and whose front face (for 6) is matched to the contour of the mixing chamber to avoid leaving any space here which cannot be purged by the purging plunger. When the flow restrictor is pushed forward into its working or restricting position, it is simultaneously rotated, the extent of rotation being no more than 90° by the time the restricting position has been reached. This makes it possible to drive the flow restrictor much further into the mixing chamber than when no rotation is effected. The tongues or projections 6 produced as a result of matching the front face to the contour of the mixing chamber only come into contact with the sections of the mixing chamber wall which are opposite the flow restrictor. The flow restrictor can be pushed in an appropriate distance, making it possible to achieve a good restricting effect and therefore to exert a corresponding great influence on the mixing procedure or on the discharge characteristics.

3 Claims, 3 Drawing Figures

U.S. Patent  Oct. 27, 1987  4,702,890

MIXING HEAD FOR MIXING TWO OR MORE PLASTICS COMPONENTS WHICH REACT TO FORM FOAM, IN PARTICULAR POLYURETHANE

The present invention relates to a mixing head.

In a known mixing head of the type stated above (German Laid-Open Application DOS No. 2,007,935), the flow restrictor is provided in order to produce a point of restriction downstream of the entry of the components being mixed into the mixing chamber and upstream of the exit from this mixing chamber, the said point of restriction being intended to have an advantageous effect on mixing. The flow restrictor has a circular cross-section and its front face is flat. When the flow is to be restricted, the flow restrictor is driven a greater or smaller distance into the mixing chamber. Since the front face is flat, the flow restrictor can be driven relatively far into the mixing chamber, until the corresponding points of the end face come into contact with the wall of the mixing chamber. However, there still remains a smaller or larger orifice which has a semicircular cross-section or represents a circular section. When the diameter or cross-section of the flow restrictor is smaller than that of the mixing chamber, the former can be pushed in relatively far, but there remains a fairly large, unrestricted cross-section to the left and right of the flow restrictor. If the cross-section of the flow restrictor is the same size as that of the mixing chamber, the flow restrictor can only be pushed half way in, and a semicircular orifice for the passage of the mixture of components remains in front of the front face of the flow restrictor. When it has been pulled back, a flow restrictor of this type having a flat front face leaves, in the housing in front of this face, a free space which has a roughly V-shaped or U-shaped cross-section, is connected to the mixing chamber and is not scraped over during the movement of the purging plunger toward the outlet orifice of the mixing chamber. In this space in front of the flow restrictor, residues of components collect; these cannot be removed by the purging plunger and are undesirable.

In another embodiment of a mixing head, it has been proposed to match the shape of the end face to the contour of the mixing chamber, which may have, for example, a circular cross-section, so that in practice the end face possesses two tongues. In the withdrawn position, the flow restrictor then fills its bore completely, leaving no space which is not scraped over by the purging piston during its movement toward the outlet orifice of the mixing chamber. Complete purging is ensured. However, when this flow restrictor is then pushed forward into its restricting position, the tongues come into contact with the wall of the mixing chamber at a very early stage, making further insertion impossible. A relatively large, lens-shaped orifice remains, so that the restricting action is frequently too small.

It is an object of the present invention to provide a mixing head of the type stated at the outset, in which on the one hand residues of components do not collect in front of the front face of the flow restrictor, ie. complete purging is possible, and on the other hand a good restricting action can be achieved.

We have found that this object is invariably achieved by the improved mixing head described herein.

Because the shape of the front face of the flow restrictor matches the contour of the mixing chamber, no space is left in which material can collect, and complete purging by the ejection plunger is possible. When the flow restrictor is rotated through 90° while being pushed into the mixing position, the two tongues resulting from the appropriate design of the end face rotate toward the top and bottom in relation to the mixing chamber, so that the flow restrictor can be driven very much further into the mixing chamber since in practice the tongues come into contact with the wall of the mixing chamber only at the lateral surface opposite the flow restrictor. A very large part of the cross-section of the mixing chamber is filled by the flow restrictor in this manner. When the flow restrictor is pulled back, rotation in the opposite direction takes place so that, after returning to its starting position, the flow restrictor again occupies its former position and completely fills its bore. The ejection plunger can then execute its purging stroke and completely purge the mixing chamber.

The rotational movement, which is preferably synchronized with the movement into the restricting position, can be executed in a wide variety of ways.

When the small open cross-sectional areas of the mixing head remain directly to the left and right of the flow restrictor in the mixing chamber, a mixture of components being forced through these areas and around the flow restrictor. This can have an advantageous effect on the mixing procedure.

The invention is illustrated below by means of an example and with reference to the drawing.

Figure 2:
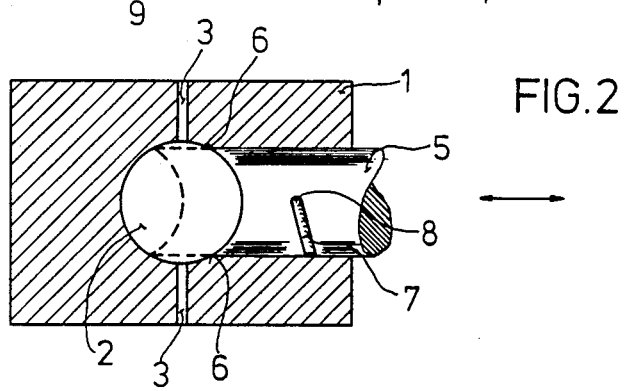
Figure 3:
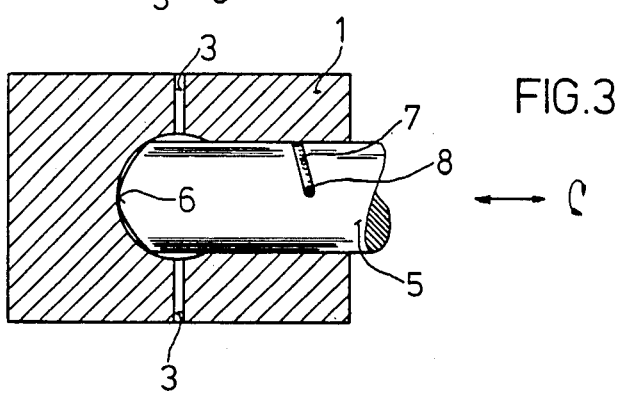

FIG. 1 shows a schematic longitudinal section through an embodiment of a mixing head according to the invention, FIG. 2 shows a cross-section through line II—II of FIG. 1, and FIG. 3 shows a cross-section corresponding to that shown in FIG. 2, but in which the flow restrictor is in the restricting position.

The mixing head shown in the drawing is known in principle and is only shown schematically. It consists of a housing 1 in which a mixing chamber 2 is formed. In this embodiment, the mixing chamber has a circular cross-section, although other cross-sections are also possible. Two inlet orifices 3 for the plastics components to be mixed lead into the mixing chamber. Only one inlet aperture can be seen. A purging plunger 4, which is matched up with the cross-section of the mixing chamber, can be moved to and fro in the mixing chamber. FIG. 1 shows the mixing position, ie. the inlet orifices are free. When a mixing process, ie. a shot, is complete, the purging piston 4 is moved toward the outlet orifice 9, closing the inlet orifices and mechanically purging the mixing chamber.

Flow restrictor 5, likewise having a circular cross-section, is arranged at right-angles to the axis of the mixing chamber. The front face of this flow restrictor is matched up with the contour of the mixing chamber 2. This will be clear if FIG. 2 is considered. In practice, two tongues 6 are formed, and these are located laterally in the view shown in FIG. 2. The flow restrictor contains an appropriately sloping groove 7 into which a guide pin 8 projects. Guide pin 8 and groove 7 form a positive connection.

When it is desired to restrict the flow in order to exert an influence on the mixing procedure in mixing chamber 2, flow restrictor 5 is pushed into mixing chamber 2 by means of an appropriate apparatus, for example hydraulically. During this operation, the guide pin 8 slides into groove 7, so that the flow restrictor is necessarily rotated according to the slope of groove 7. In the embodiment shown, the conditions have been chosen so that the flow restrictor has rotated 90° on reaching its final position (FIG. 3). The tongues 6 which are located laterally in FIG. 2 are then above and below in the position shown in FIG. 3. It can readily be seen that, as a result of this forced rotation, the flow restrictor can be driven very much further into the mixing chamber 2, since the tongues 6 only come into contact with the wall sections of the mixing chamber 2 which lie opposite the flow restrictor. If no rotational movement were to take place, the tongues 6 (cf. FIG. 2) would come into contact with the wall of the mixing chamber at a very much earlier stage. Furthermore, a very large, roughly lens-shaped orifice would remain, the restricting action of which would be correspondingly small. Rotating the flow restrictor while it is being pushed forward not only makes it possible to drive the flow restrictor further in, but also results in the front face, the shape of which is matched to the contour of the mixing chamber, being brought into a vertical position, so that the rear part of the front face of the flow restrictor is not effective in the restricting position since it is covered by the tongues.

It is obvious to the skilled worker that, instead of the constrained guidance by means of a groove and a guide element, it is also possible to provide another method for rotating the flow restrictor in the desired manner.

I claim:

1. A mixing head for a plurality of plastic components which react to form a foam, said mixing head comprising a housing having a mixing chamber and defining therein a circular cross-sectional flow area, a purging plunger in said mixing chamber and movable along an axis of said mixing chamber, inlets orifice means for supplying plastic components to said mixing chamber, flow restrictor means disposed at an angle to the mixing chamber axis, means for positioning said flow restrictor in a first position such that the restrictor extends into said mixing chamber and restricts the cross-sectional flow area of the mixing chamber and for positioning the flow restrictor in a second position such that the cross-sectional flow area is unrestricted, said flow restrictor means being located downstream of the inlet orifice means and having a front face whose contour matches that of the mixing chamber, and means for rotating said restrictor means 90° relative to an axis of the restrictor means during its movement into said first position.

2. A mixing head as claimed in claim 1, wherein the flow restrictor means is rotatable by means of constrained guidance, the latter being effected by a groove of appropriate slope in the flow restrictor means and a guide element which projects into this groove.

3. A mixing head as claimed in claim 1, wherein the flow restrictor means has a smaller cross-section than the mixing chamber.

* * * * *